United States Patent [19]

Raab et al.

[11] Patent Number: 4,998,608
[45] Date of Patent: Mar. 12, 1991

[54] CLUTCH DISK WITH DELAYED FRICTION DEVICE

[75] Inventors: Harald Raab, Schweinfurt; Norbert Ament, Werneck; Dieter Bernhard, Schwebheim, all of Fed. Rep. of Germany

[73] Assignee: Fichtel & Sachs AG, Schweinfurt, Fed. Rep. of Germany

[21] Appl. No.: 549,905

[22] Filed: Jul. 9, 1990

[30] Foreign Application Priority Data

Jul. 11, 1989 [DE] Fed. Rep. of Germany ....... 3922730

[51] Int. Cl.[5] ............................................... F16D 3/66
[52] U.S. Cl. ................................................. 192/106.2
[58] Field of Search ......................... 192/106.2; 464/63

[56] References Cited

U.S. PATENT DOCUMENTS

| 4,586,595 | 5/1986 | Hartig et al. | 192/106.2 |
| 4,603,767 | 8/1986 | Blond | 192/106.2 |
| 4,700,821 | 10/1987 | Maucher et al. | 192/106.2 |
| 4,700,822 | 10/1987 | Maucher et al. | 192/106.2 |
| 4,860,871 | 8/1989 | Graton et al. | 192/106.2 X |
| 4,883,156 | 11/1989 | Rohrle et al. | 192/106.2 |
| 4,890,712 | 1/1990 | Maucher et al. | 192/106.2 |
| 4,899,862 | 2/1990 | Graton et al. | 192/106.2 |

FOREIGN PATENT DOCUMENTS 3400183 7/1985 Fed. Rep. of Germany .
2184812 7/1987 United Kingdom .

Primary Examiner—Rodney H. Bonck
Attorney, Agent, or Firm—Toren, McGeady & Associates

[57] ABSTRACT

The invention relates to a clutch disk having a torsional vibration damper (19) for motor-vehicle clutches, a delayed friction device (51) being arranged in a space-saving manner radially above a friction ring (45) effective in the load region.

10 Claims, 5 Drawing Sheets

CLUTCH DISK WITH DELAYED FRICTION DEVICE

BACKGROUND OF THE INVENTION

The invention relates to a clutch disk for a motor-vehicle friction clutch and in particular a clutch disk having a torsional vibration damper to which a delayed friction device is allocated, i.e. a friction device coming into effect in a delayed manner during torsional vibration stress.

DE-A-3,545,745 (UK-A-2,184,812) discloses a clutch disk for a motor-vehicle friction clutch having two spring devices which are arranged axially side-by-side on a hub and of which each comprises a hub disk and two lateral disks which are arranged axially on either side of the hub disk and which in each case are coupled in a torsionally elastic manner to the allocated hub disks via a plurality of springs. The first spring device is dimensioned for the load operation. Its hub disk, via a tooth system, is connected to the hub in such a way as to be fixed in terms of rotation but with rotary play, while one of the lateral disks of the first spring device carries clutch friction linings. The second spring device is dimensioned for the idling operation and is arranged axially to the side of the first spring device. Such a clutch disk has comparatively large axial dimensions, and the spring device dimensioned for the idling operation is freely accessible and thus unprotected. In a variant of the known clutch disk, the springs dimensioned for the idling operation sit directly in the tooth system coupling the clutch disk of the first spring device to the hub. This type of construction certainly reduces the axial dimensions of the clutch disk but limits the torsional vibration angle available for the idling operation and furthermore reduces the torque which can be transmitted via the tooth system. A first friction device dimensioned for the load operation is allocated to the spring device, dimensioned for the load operation, of the known clutch disk. A second friction device having "delayed" friction action is provided between the lateral disks of the first spring device and the hub. The delayed friction device is arranged on the hub likewise axially to the side of the spring device dimensioned for the load operation and is thus freely accessible in an unprotected manner, which can lead to faults in operation.

DE-A-3,345,409 (US-A-4,586,595) discloses a further clutch disk for a motor-vehicle friction clutch in which the idling-spring device, consisting of two lateral disks and a hub disk coupled to the lateral disks in a torsionally elastic manner via springs, is arranged axially between the lateral disks of a load-spring device. The load-spring device comprises a hub disk which is coupled to the lateral disks in a torsionally elastic manner via springs and is in turn coupled via a tooth system to a hub of the clutch disk in such a way as to be fixed in terms of rotation but with rotary play. Separate friction devices dimensioned for the idling operation and the load operation respectively are allocated to the two spring devices, which friction devices are arranged axially side-by-side likewise between the two lateral disks of the load-spring device. Although the friction devices are accommodated in a protected manner between the lateral disks, matching the friction properties to one another can be relatively difficult in the individual case. Similar relationships result in a clutch disk disclosed by U.S. Pat. No. 4,603,767.

Finally, DE-A-3,400,183 discloses a torsional vibration damper for the clutch disk of a motor-vehicle friction clutch whose single spring device dimensioned for the load operation has allocated to it two friction devices. The friction devices are arranged between the lateral disks of the spring device and have friction rings which are arranged coaxially one inside the other and are loaded by an axial force from a common spring.

Thus it is a main object of the invention to provide a clutch disk having a torsional vibration damper which has favorable damping properties in idling operation and which, furthermore, has a comparatively small construction volume. In addition, the clutch disk is to be insensitive to external influences.

SUMMARY OF THE INVENTION

The clutch disk according to the invention has two spring devices which in each case have a hub disk and two lateral disks arranged axially on either side of the hub disk and coupled to the hub disk by springs in a torsionally elastic manner. Whereas the first spring device is dimensioned for the load operation, the second spring device is dimensioned for the idling operation. The second spring device is fully accommodated between the hub disk and one of the lateral disks of the first spring device. The working range of the second spring device is established by a tooth system via which the hub disk of the first spring device is coupled to a hub of the clutch disk in such a way as to be fixed in terms of rotation but with rotary play. Allocated to the spring devices are a plurality of friction devices which are all likewise accommodated in a protected manner between the lateral disks of the first spring device. A first friction device is dimensioned for the load operation and comprises a friction ring which is arranged axially between lateral disks, adjacent to one another, of the first and second spring device and provides for axial fixing of this lateral-disk pair relative to one another. A second friction device is constructed as a "delayed" friction device and is arranged in the area of this lateral-disk pair radially in the space outside the friction ring of the first friction device. The control disk is coupled via axial lobes to the hub disk of the second spring device in such a way as to be fixed in terms of rotation but with rotary play. The second friction device is conveniently dimensioned in such a way that it comes into use within the working range of the second spring device dimensioned for idling.

In advantageous embodiments, a preloading spring, designed as a corrugated spring, for producing an axial contact pressure is allocated to the delayed friction device. The corrugated spring, via windows on its periphery, is conveniently coupled to the lobes of the control disk in such a way as to be fixed in terms of rotation and, in the area of these windows, i.e. in the area of its greatest axial extent, has flat areas, normal to the axis, with which it bears against the control disk. The delayed friction device likewise preferably comprises a friction ring, and the friction ring is conveniently connected via axially projecting lugs to the control disk in such a way as to be fixed in terms of rotation. The lugs are preferably arranged on the friction ring, rectangular in cross-section, and engage into windows, open radially to the inside, on the inner periphery of the control disk. So that the available construction space between the lateral disks of the first spring device can be utilized in an especially favorable manner and in particular so that dimensional differences between the individual components do not have to be compensated by increasing the thickness of the load friction ring, the friction ring of the delayed friction device conveniently sits in an annular niche, pressed axially outwards, of the lateral disk of the first spring device.

The various features of novelty which characterize the invention are pointed out with particularity in the claims annexed to, and forming part of, this disclosure. For a better understanding of the invention, its operating advantages and specific objects attained by its use, reference should be had to the accompanying drawings and descriptive matter in which there are illustrated and described preferred embodiments of the invention.

DESCRIPTION OF PREFERRED EMBODIMENTS

Figure 1:
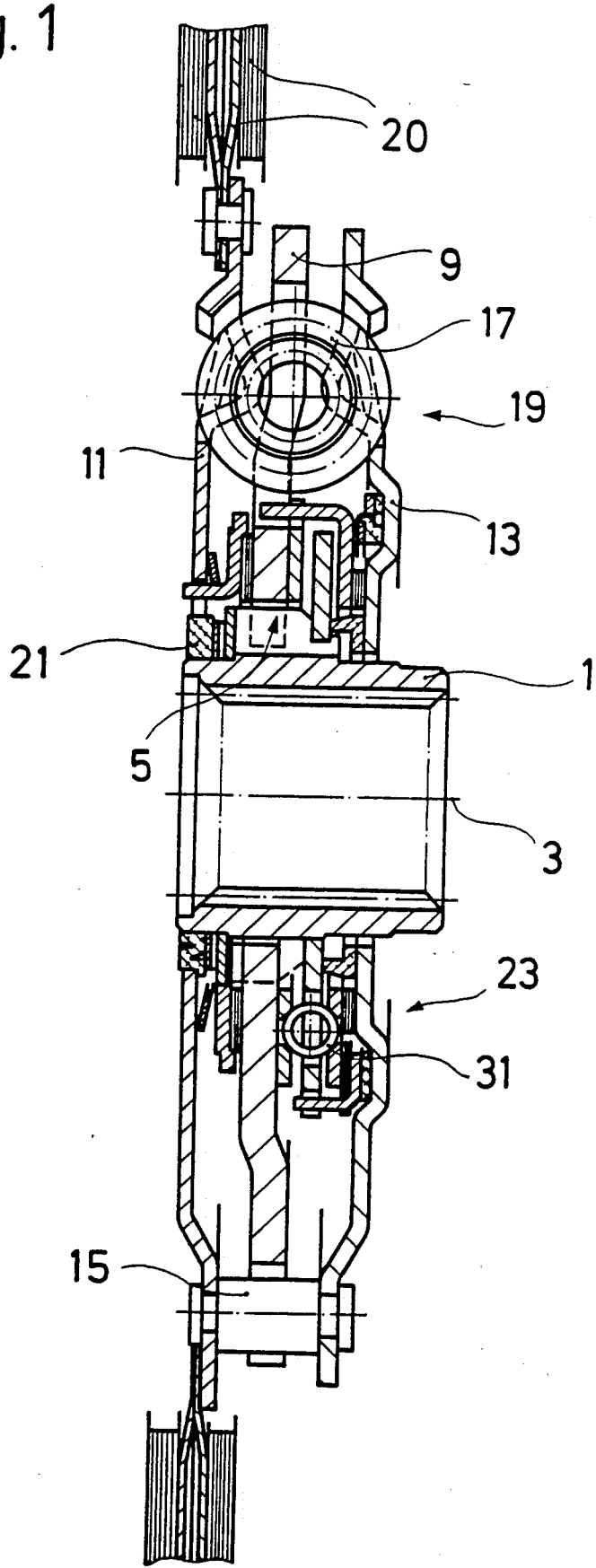
FIG. 1 shows a longitudinal section through a clutch disk.
Figure 2:
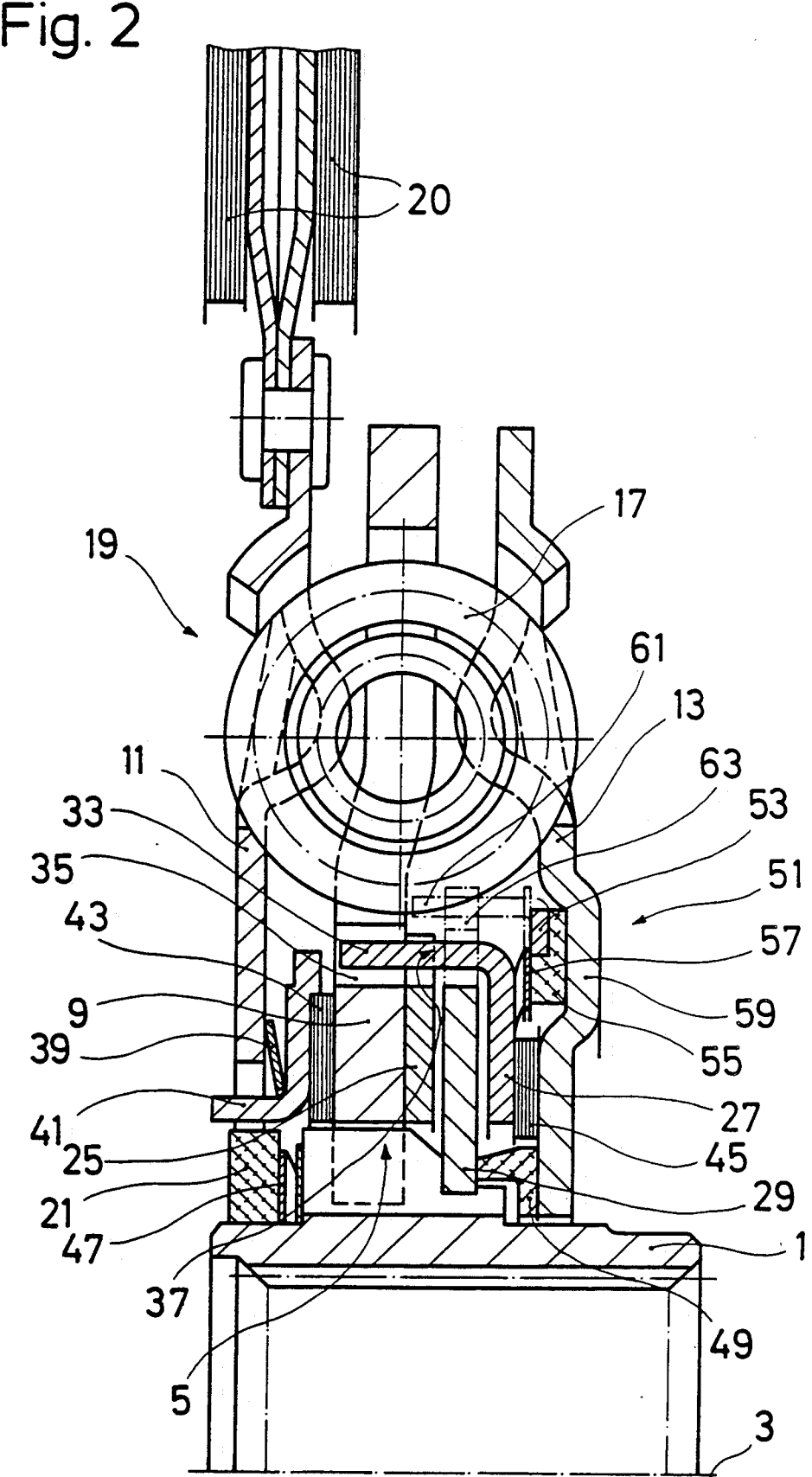
FIG. 2 shows the enlarged representation of the upper half of the section according to FIG. 1.
Figure 3:
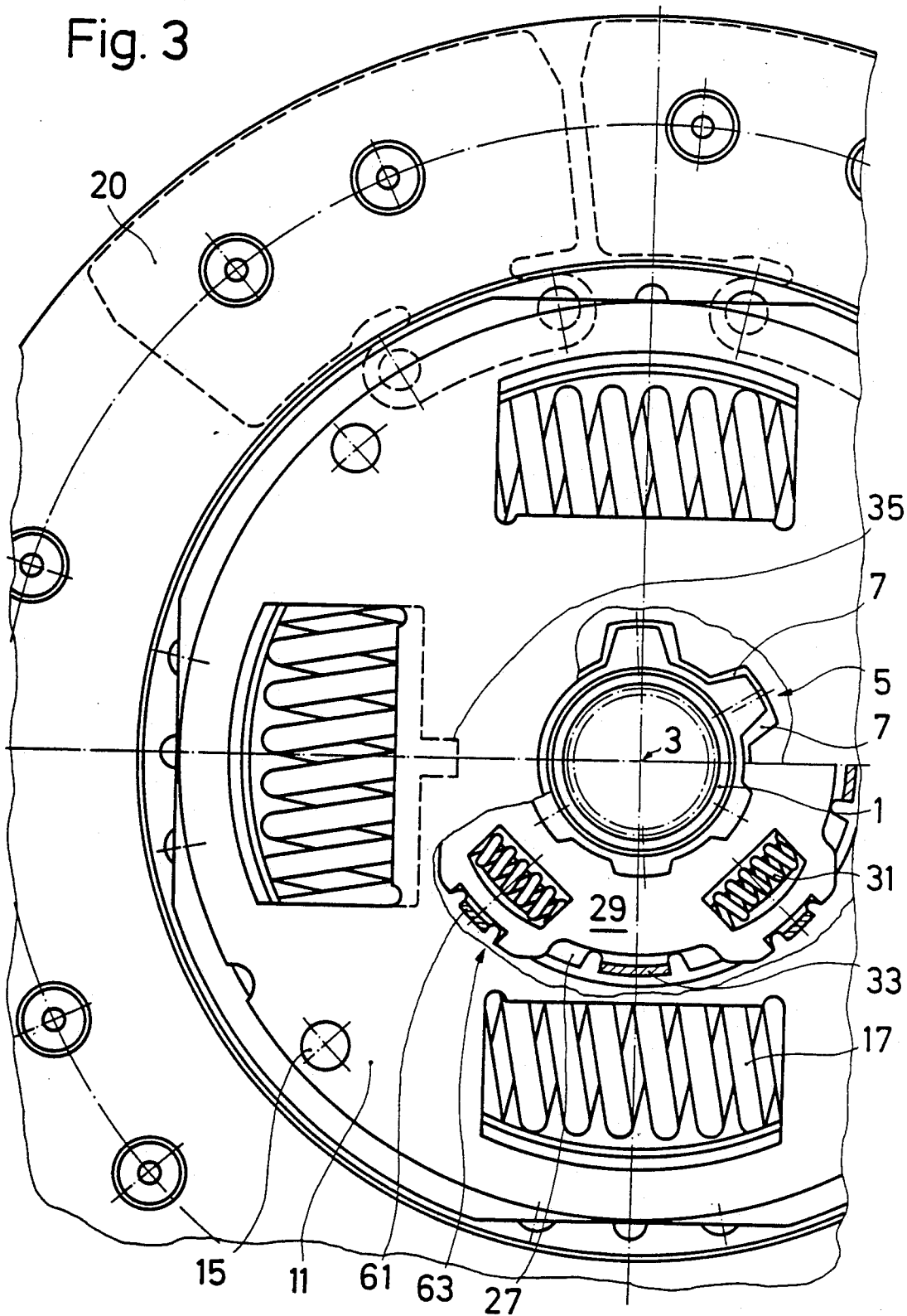
FIG. 3 shows a partial elevation with individual sectioned areas.
Figure 9:
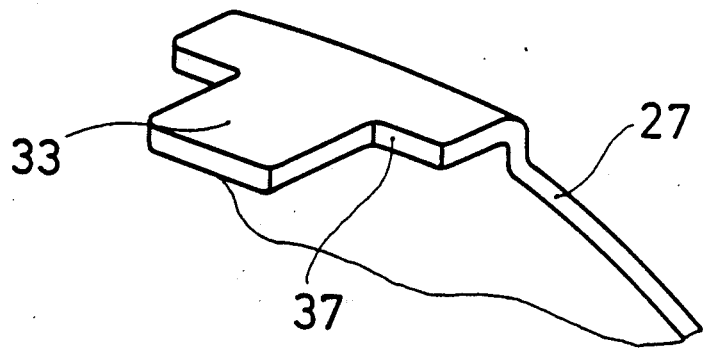
FIG. 9 shows the partial elevation of the cover plate.

FIGS. 1 to 3 show the overall situation of the clutch disk. The clutch disk, with its hub 1, is mounted on a transmission shaft (not shown) in such a way as to be fixed in terms of rotation—but axially displaceable—and rotates about an axis 3 of rotation. Via a tooth system 5 having rotary play 7 it is otherwise connected to a hub plate 9 in such a way as to be fixed in terms of rotation. Arranged on either side of the hub disk 9 are lateral disks 11, 13, also called cover plates below, which, in the area of their outside diameter, are connected to one another via connecting rivets 15 in such a way as to be fixed in terms of rotation. Springs 17 of a load-spring device 19 are arranged in windows of the cover plates 11, 13 as well as in windows of the hub disk 9. Friction linings 20 are fixed to the outer periphery of the cover plate 11. The cover plates 11 and 13, via a bearing ring 21 on .he inside diameter of the cover plate 11, are rotatably guided together in the radial direction relative to the hub 1. Arranged between the hub disk 9 and the cover plate 13 is an idling-spring device 23 which consists of two lateral disks or cover plates 25 and 27, a hub disk 29 as well as springs 31. In this arrangement, the hub disk 29 is put onto the hub 1 in such a way as to be fixed in terms of rotation and all rotatable components are axially secured relative to it. The outer cover plate 27, in the area of its outer periphery and radially outside the springs 31, has axially angled lobes 33 which project into recesses 35 of the hub disk 9 and here make a rotary connection free from peripheral play. The same lobes 33 also peripherally fix the internal cover plate 25, and, viewed in axial direction—also see FIG. 9—the cover plate 27 rests on the cover plate 25 via supporting edges 37, and both cover plates are supported axially on the hub plate 9. The axial supporting force is here produced by a disk spring 39 which is arranged between the cover plate 11 and an angle ring 41 which is connected to the cover plate 11 in such a way as to be fixed in terms of rotation —but axially displaceable—and loads a friction ring 43 which in turn is supported on the hub disk 9. The axial force of the disk spring 39 is passed via the connecting rivets 15 to the cover plate 13 and from there in turn, via a friction ring 45, to the outer cover plate 27 of the idling-spring device 23. Thus this system, viewed in the axial direction, is self-contained. The rotatable components are axially guided via the bearing ring 21, which is inserted in an axially fixed manner into the cover plate 11. It is loaded by a corrugated spring 47 which is supported on the hub 1 and whose supporting force is transmitted via the connecting rivets 15 to the opposite cover plate 13, from where it is passed back again to the hub 1 via a spacer ring 49 and the hub disk 29. In this respect, the hub 1 together with the corrugated spring 47, the bearing ring 21 and the spacer ring 49, forms a friction device having a low friction value which is effective over the entire torsion-angle range and, in the idling range, at small torsion angles, produces the only friction force. In the load region, in addition to this friction force, there is a further friction force which is produced by the two friction rings 43 and 45 as well as the disk spring 39. Furthermore, a so-called delayed friction device 51 is provided which consists of the hub disk 29, a control disk 53, also called control plate below, a friction ring 55 and a corrugated spring 57. This friction device 51 is arranged radially outside the friction ring 45, the cover plate 13, for this purpose, being provided with a niche 59 directed to the outside. The control plate 53 has a plurality of lobes 61 which are distributed on the periphery, are to point axially in the direction of the hub disk 29 and engage with peripheral play into windows 63 of the hub disk 29. Here, in FIG. 2, for a clearer representation, one of the lobes 61, shown by chain-dotted line, is swung into the cutting plane, whereas in the exemplary embodiment according to FIG. 3 the lobes 61 and 33 are arranged so as to be distributed in the peripheral direction. They can consequently be attached essentially on the same diameter and thus take up little space in the radial direction.

Figure 4:
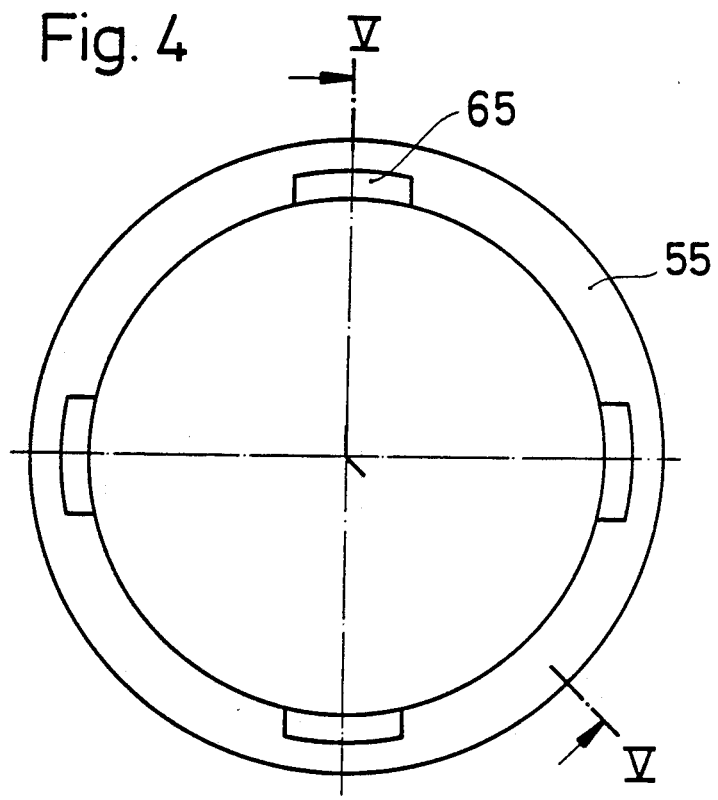
FIGS. 4 and 5 show an elevation and a section V—V of a friction ring.
Figure 5:
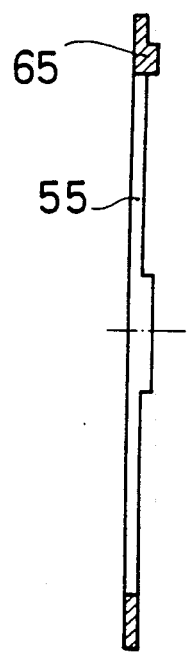
Figure 6:
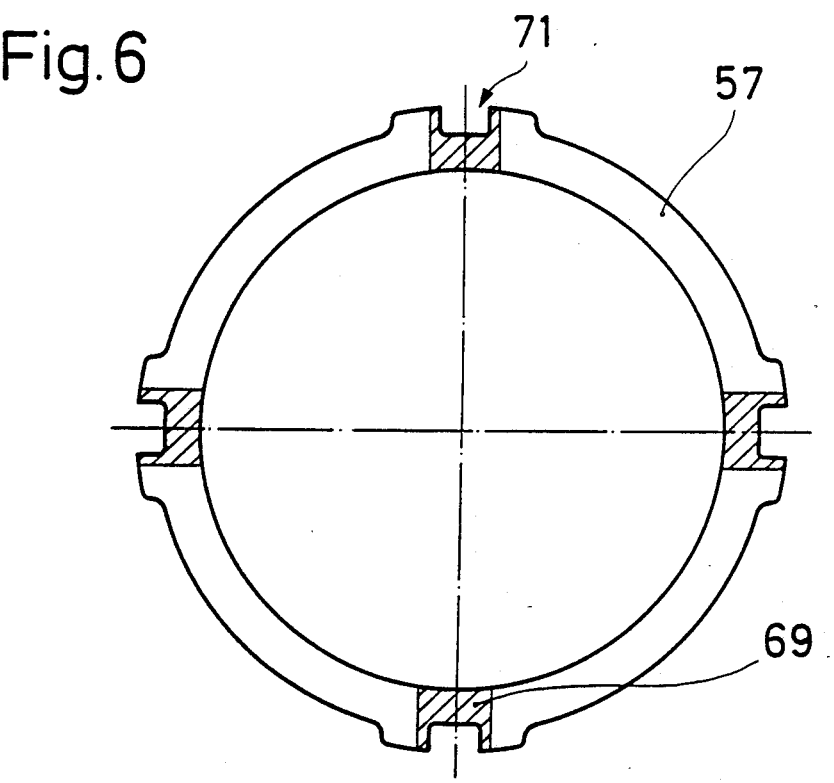
FIG. 6 shows the elevation of the corrugated spring.
Figure 7:
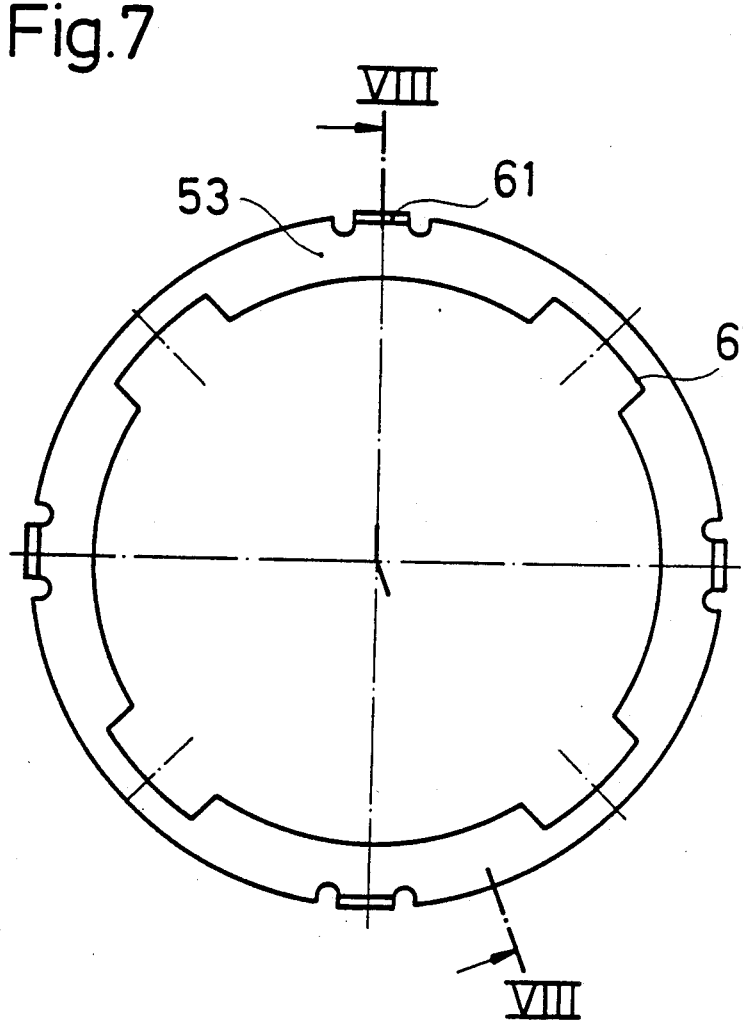
FIGS. 7 and 8 show an elevation and a section VIII—VIII of a control disk.
Figure 8:
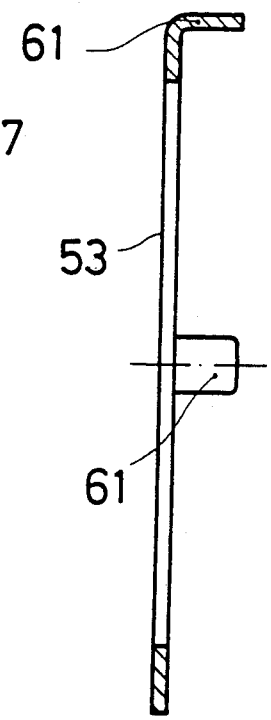

The three components of the friction device 51 are shown in FIGS. 4 to 8. FIG. 4 shows the friction ring 55, which is made of plastic and has a rectangular annular cross-section from which lugs 65 project in the axial direction, starting from the inside diameter of the cross-section, which lugs 65 run toward the control plate 53. The control plate 53 according to FIG. 7 is constructed as a shaped sheet-metal part, likewise has a rectangular cross-section and, at its outer periphery, is provided with a plurality of the axially projecting lobes 61 which, in the installation position, run toward the hub disk 29 of the idling-spring device 23 and engage there with peripheral play into the windows 63 open radially to the outside. Furthermore, the control plate 53 has windows 67 which open radially to the inside and, in the installation position, surround the peripheral end edges of the lugs 65 of the friction ring 55 free from play and thus produce a unit, fixed in terms of rotation, between friction ring 55 and control plate 53. The corrugated spring 57 according to FIG. 6 is arranged between this unit and the cover plate 27, which corrugated spring 57 has axial corrugations for producing a contact pressure, a plurality of areas 69 distributed on the periphery being of flat design and windows 71 open radially to the outside being provided in these areas 69, into which windows 71 the lugs 61 of the control plate 53 likewise engage free from peripheral play. The flat areas 69, which are at the same time arranged at the location of maximum axial extent of the corrugated spring 57, permit satisfactory connection, free from peripheral play, to the lobes 61 of the control plate 53 while permitting unrestricted axial movement.

The function of the clutch disk is explained below:

In idling operation of the internal combustion engine, the parts of the load-spring device 19, 11, 13, 17, 9 are to be considered as a rigid construction unit, and they move relative to the hub 1 in the peripheral direction merely within the rotary play 7 of the tooth system 5 between the hub disk 9 and the hub 1. In this operating state, the idling-spring device 23, with its springs 31, is loaded. The loading of the springs 31, via the two cover plates 25 and 27, connected to the hub disk 9 in such a way as to be fixed in terms of rotation, is effected on the hub disk 29 connected to the hub 1 in such a way as to be fixed in terms of rotation. In this respect, the following components are in action for producing friction first of all the idling-friction device effective over the entire operative range of the clutch disk and consisting of the parts 21, 47, 49, 1, and in addition friction force of the delayed friction device 51 occurring when an angle predetermined by the matching is exceeded, which friction device 51 is active as follows: the components 57, 53, 55, as a result of their friction mounting, are driven along by the components 27 and 13 rotating synchronously during idling operation, and the friction force obtainable with the friction device 51 is then built up when the lobes 61 of the control plate 53 strike peripherally against the windows 63 of the fixed hub disk 29. As a result, every time during reversal of the direction of rotation, an idle path in accordance with the play between the lobes 61 and the windows 63 is first of all covered without producing friction force. As soon as the clutch disk is working in the load region, the rotary play 7 in the tooth system 5 is completely used up, and the hub disk 9 as well as the cover plates 25 and 27 of the idling-spring device 23 are to be considered as being fixed to the hub 1 in terms of rotation Also, the control plate 53 plus the friction ring 55 are likewise to be considered as being fixed to the hub 1. In this case, the friction is composed of the friction of the components 21, 47, 49, 1; 43, 45, 41, 27, 9; 57, 53, 55, 27, 13. It should also be mentioned here that, during every reversal of the direction of rotation of the rotatable components relative to the hub 1, the delayed friction device 51 first passes through the clearance angle and then becomes effective again. Furthermore, the matching of the friction force can be effected in a simple manner by friction rings being used which have a different material composition. It is also readily possible to have the control plate bear directly against the cover plate so that a friction force is produced here in accordance with the pairing of steel on steel.

While specific embodiments of the invention have been shown and described in detail to illustrate the application of the inventive principles, it will be understood that the invention may be embodied otherwise without departing from such principles.

What we claim is:

1. A clutch disk for a motor-vehicle friction clutch, comprising:

(a) a hub (1) which defines an axis (3) of rotation,
   (b) a first spring device (19) dimensioned for the load operation, which first spring device (19) has a first hub disk (9) connected via a tooth system (5) to the hub (1) in such a way as to be fixed in terms of rotation but with limited rotary play (7), two first lateral disks (11, 13) arranged axially on either side of the first hub disk (9), firmly connected to one another but rotatable relative to the hub (1) and to the first hub disk (9) about the axis (3) of rotation, and a plurality of first springs (17) coupling the first lateral disks (11, 13) to the first hub disk (9) in a torsionally elastic manner,
   (c) a spring device (23) arranged axially between the first hub disk (9) and one (13) of the two first lateral disks and radially in the space between the hub (1) and the first springs (17) and dimensioned for the idling operation, which spring device (23) has a second hub disk (29) firmly connected to the hub (1), two second lateral disks (25, 27) arranged axially on either side of the second hub disk (29), coupled to one another and to the first hub disk (9) in such a way as to be fixed in terms of rotation and rotatable together with the latter relative to the second hub disk (29), and at least one second spring (31) coupling the second lateral disks (25, 27) to the second hub disk (29) in a torsionally elastic manner,
   (d) a first friction device (39, 43, 45) dimensioned for the load operation, which first friction device (39, 43, 45) has a first friction ring (45) arranged axially between the first lateral disk (13), axially adjacent to the second spring device (23), and the second lateral disk (27), axially adjacent to this first lateral disk (13), and frictionally coupling this lateral-disk pair (13, 27), and a first preloading spring (39) arranged on the side of the first hub disk (9) axially remote from the second spring device (23) and producing an axial supporting force for the first friction ring (45),
   (e) a second friction device (51) which comes into effect in a delayed manner during relative rotation between the hub (1) and the first lateral disks (11, 13), is arranged radially in the space between the first friction ring (45) and the first springs (17) and overlaps radially with the second lateral disk (27) of the lateral-disk pair (13, 27), which second friction device (51) has a control disk (53) arranged axially between the lateral disks of the lateral-disk pair (13, 27) frictionally coupled by the first friction ring (45), rotatable relative to the lateral-disk pair (13, 27) and the second hub disk (29) about the axis (3) of rotation and in friction contact with one of the lateral disks (13) of the lateral-disk pair. (13, 27), from the outer peripheral area of which control disk (53) lobes (61) project axially which, with play in the relative direction of rotation, engage into windows (63) of the second hub disk (29), and at least one second preloading spring (57) arranged axially between the control disk (53) and the other respective lateral disk (27) of the lateral-disk pair (13, 27) and producing an axial supporting force, and
   (f) clutch friction linings (20) mounted on one (11) of the first lateral disks (11, 13).

2. The clutch disk as claimed in claim 1, wherein the second preloading spring (57), at its outer periphery, has a plurality of windows (71) which are open radially to the outside and through which axial lobes (61) of the control disk (53) pass essentially without play in the peripheral direction for the connection, fixed in terms of rotation, of the second preloading spring (57) to the control disk (53).

3. The clutch disk as claimed in claim 2, wherein the second preloading spring is designed as a corrugated not only has its greatest axial extent but also runs in a flat manner in a plane normal to the axis.

4. The clutch disk as claimed in claim 3, wherein the flat areas (69) extend in the radial direction over the entire radial height of the corrugated spring (57) and, in the peripheral direction, in each case extend beyond the width of the windows (71).

5. The clutch disk as claimed in claim 1 wherein the second preloading spring (57) is arranged axially on the side of the control disk (53) situated toward the second spring device (23), and a second friction ring (55) is provided axially between the control disk (53) and the second lateral disk (13) of the lateral-disk pair (13, 27).

6. The clutch disk as claimed in claim 5, wherein the second friction ring (55) and the control disk (53), by means of lugs (65) on one of these parts (55) which engage into windows (67) of the other (53) of these parts, are connected to one another in such a way as to be fixed in terms of rotation.

7. The clutch disk as claimed in claim 6, wherein the second friction ring (55) has a rectangular annular cross-sectional profile and, adjoining its inner periphery, has a plurality of lugs (65) which are distributed in the peripheral direction, project toward the control disk (53), are integrally formed in one piece, extend approximately over half the radial height of the annular cross-sectional profile and engage into windows (67), open radially to the inside, on the inner periphery of the control disk (53).

8. The clutch disk as claimed in claim 5 wherein the first lateral disk (13) directly adjacent to the second spring device (23) has an annular niche (59) whose depth -s approximately equal to the axial extent of the second friction ring (55) and in which the second friction ring (55) is arranged.

9. The clutch disk as claimed in claim 1 wherein the two second lateral disks (25, 27), via axial lobes (33) of the second lateral disk (27) axially adjacent to the second friction device (51), are connected to one another and to the first hub disk (9) in such a way as to be fixed in terms of rotation, and wherein the lobes (33) of the second lateral disk (27) are offset in the peripheral direction relative to the lobes (61) of the control disk (53).

10. The clutch disk as claimed in claim 1 wherein a third friction device (47, 49) dimensioned for the idling operation is provided axially between the first lateral disks (11, 13) and radially in the space between the first friction ring (45) and the hub (1), which third friction device (47, 49), axially on one side of the first hub disk (9), has a third friction ring (49) supported between the first lateral disk (13) and the hub (1) and, on the axially opposite side of the first hub disk (9), has a third preloading spring (47) supported between the other first lateral disk (11) and the hub (1).

* * * * *